Nov. 25, 1969  J. K. SMITH  3,479,775
WORK HANDLING FIXTURE
Filed Feb. 27, 1967
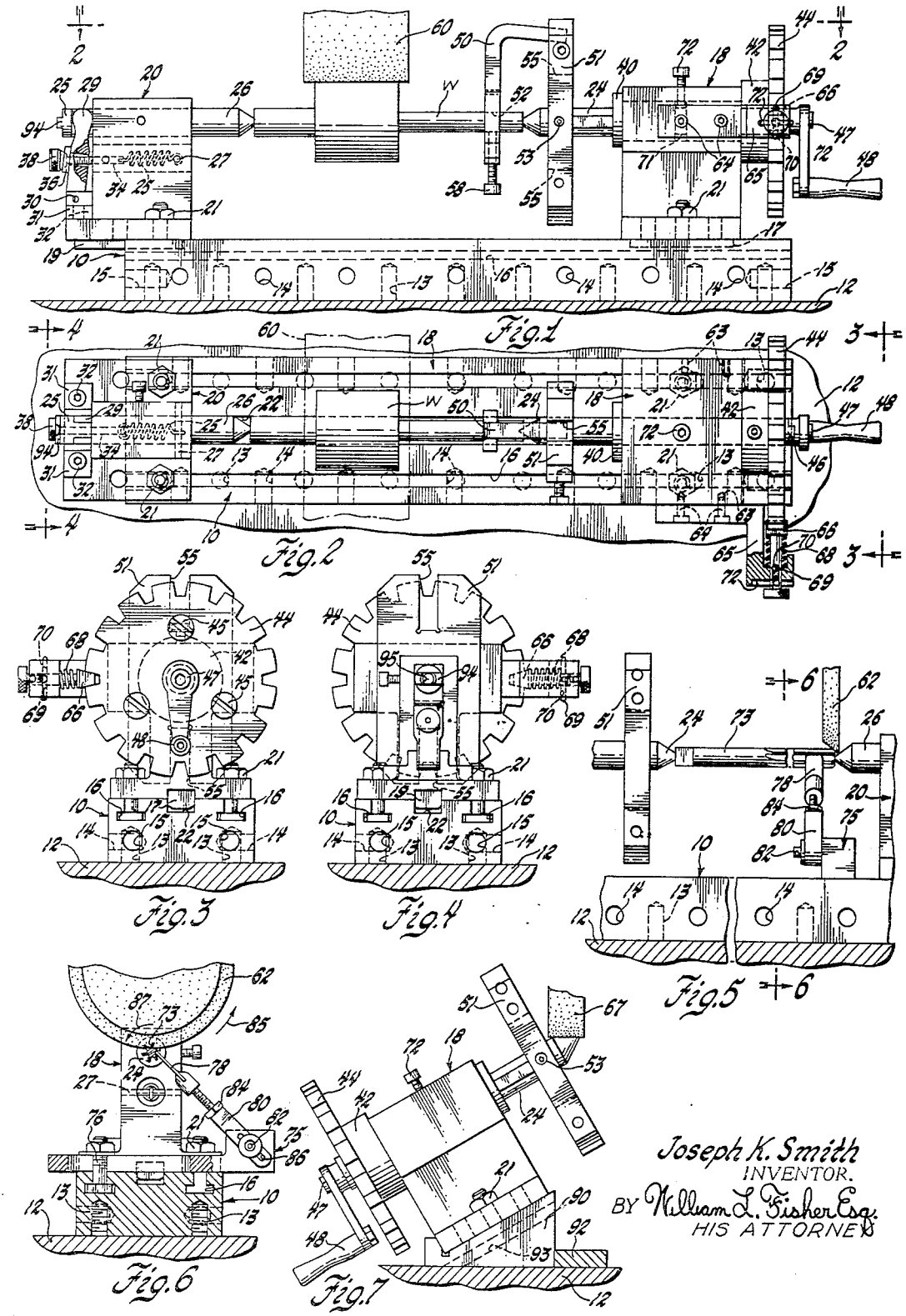
Joseph K. Smith
INVENTOR.
BY William L. Fisher Esq.
HIS ATTORNEY United States Patent Office 3,479,775
Patented Nov. 25, 1969

3,479,775
WORK HANDLING FIXTURE
Joseph K. Smith, 14705 Colpaert Drive,
Warren, Mich. 48093
Filed Feb. 27, 1967, Ser. No. 618,702
Int. Cl. B24b 5/00, 41/06, 47/02
U.S. Cl. 51—237                                            4 Claims

ABSTRACT OF THE DISCLOSURE

A work handling fixture for surface grinding machines or the like is shown and described which comprises a base, a headstock and a tailstock carried on said base, and a pair of axially aligned centers one carried in each of said headstock and tailstock. The two centers have conical ends and are yieldably maintained spaced from each other for rotatably holding a work part therebetween. One of the centers is directly driven at manual speeds the same as and by a manually operable crank. The fixture further comprises connecting means fast to the rotatably driven center for clamping to said work part so that the latter is driven the same as and by the former in respect to movement including rotation. Said fixture further comprises locking means for locking the rotatably driven center against rotation. Said fixture further comprises indexing means cooperative with said locking means by which the work part may be rotated between predetermined and precise positions of rotation and held locked in each said position against rotation.

My invention relates to work handling fixtures.

The principal object of my invention is the provision of such a fixture which will hold workpieces in precise positions and provide for their manual rotation where necessary for work operations particularly grinding so as to extend the range of usefulness of surface grinding machines.

The foregoing object of my invention and its advantages will become apparent during the course of the following description, taken in conjunction with the accompanying drawings, in which:

FIGS. 1 and 2 are, respectively, side elevational and plan views of a grinding fixture embodying my invention;

FIGS. 3 and 4 are opposite end elevational views thereof;

FIGS. 5 and 6 are, respectively, fragmentary side elevational and sectional views thereof illustrating a different use therefor; and FIG. 7 is a side elevational view of parts of said fixture illustrating a still different use therefor.

Referring to the drawings in greater detail, 10 designates a base for the grinding fixture which base 10 is solid and flat so as to be held firmly in place on the flat magnetic table 12 of a surface grinder. For using mounting structure for the fixture other than the magnetic table 12, such as a sine plate or a subbase, the base 10 is provided with tapped apertures 13, 14 and 15 in its bottom, sides and ends, respectively. A pair of longitudinally extending inverted T-slots 16 are formed in the base for mounting thereon a headstock 18 and a tailstock 20. The bottoms of the latter are provided with apertured flanges by which they are bolted to the base 10 in adjustable positions axially thereof by fastening means 21 in the form of inverted bolts and nuts, the heads of which bolts operate in the T-slots 16 and the shanks of which extend through such flanges. The headstock 18 and tailstock 20 are provided with stabilizing bars 17 and 19, respectively, which are press fitted in open slots centrally formed in their bottom surfaces and slide in a central longitudinally extending slot 22 in the base 10.

The upper portions of the headstock 18 and the tailstock 20 are provided with centers 24 and 26, respectively, the free ends of which are conically shaped for holding workpieces such as the workpiece W, in axial positions spaced vertically from the base 10 as shown in FIG. 1. The center 26 is slidable axially of the tailstock 20. Its rear is enlarged, as at 25, for engaging the forked free end of a lever 29 which is pivotally mounted at the rear of the tailstock 20 by an axle 30 supported by means 31, 32. The lever 29 is biased so that its free end urges the center 26 outwardly of the front end of the tailstock 20 toward the center 24 by a tension spring 25, one end of which is anchored, as at 27, to a stationary structure in the tailstock 20, the other end of which is connected to one end of a rod 34 which extends through the lever 29. The other end of the rod 34 is threaded and engages a knurled thumb screw 38 which operates against a washer 36 for adjusting the tension of the spring 25. The insertion of the workpiece W between the centers 24 and 26 is accomplished by placing an end of the workpiece W over the center 26 and forcing the latter rearwardly of the tailstock 20 against the urging of the spring 25 to increase the gap between the centers 24 and 26 sufficiently so that the other end of the workpiece W can be placed over the center 24. The center 24 is rotatably carried in the headstock 18 but is made first axially thereof by means 40 and 42 which bear against opposite faces of the headstock 18 and take up thrust of axial forces on the center 24. The means 40 is an enlargement integral with the center 24 and the means 42 is a circular plate with a central aperture which fits over the rear portion of the center 24. An enlarged plate 44 used for rotatably indexing the center 24 as will be described is fastened via three screws 45 to the rear face of the plate 42. The two plates 42, 44 and the rear portion of the center 26 are provided with flats so that the center 26 cannot rotate whenever the plate 44 is held fast against rotation as will be described. The center 24 is rotated manually during grinding by means of a crank 48 which is fastened on the rear end of the center 24 by means 46, 47. The workpiece W is rotatably driven by the center 24 preferably by a positive connection between the two comprising a driving dog 50 and a connector plate 51 therefor. The plate 51 is held fast to the center 26 via fastening means 53 and is slotted at its opposite ends as at 55 for receiving and holding the rearwardly extending bent end of the dog 50 via either such slot 55. The other lower end of the dog 50 is provided with an aperture 52 by which it encompasses the workpiece W to which it is held fast via fastening means 58.

With the fixture disposed on the table 12 so that its axis parallels that of the grinding wheel 60 of the surface grinder the workpiece W may thus be held firmly between the centers 24 and 26 and rotated manually by the crank 48 against the rapidly rotating wheel 60 to grind cylindrical forms on all types of tools, gages and machine parts. Any surface grinder may thus be converted to an O.D. grinder by virtue of said fixture. If the working radial face of the grinding wheel of the surface grinder is tapered as shown, for example, for the grinding wheel 62 in FIG. 5 tapered outside diameters may be produced on work parts by holding and rotating them by use of said fixture. Oftentimes it is desirable to produce work parts having opposed flats ground thereon and to accomplish this the work part must be held against rotation during grinding of such flats. Since such flats are individually ground the work part must be axially rotated and accurately indexed into the different positions for such grinding. An index plate having its periphery appropriately formed into divisions, such as the plate 44, is used for this purpose. The division of the periphery of the index plate 44 is by open wedge-shaped slots as shown. Each side of the head stock 18 is provided with threaded apertures 63 by which an arm 65 may be secured to the fixture on either side thereof via fastening means 64. The arm 65 projects laterally from the respective side of the fixture and slidably carries a plunger 66 the free end of which is wedge shaped to engage in the divisions of the plate 44 to hold the latter and hence the center 24 fast against rotation. The plunger 66 is biased into such engagement with the plate 44 by a compression spring 68 which operates against the arm 65 and upon the enlargement formed as shown on such free end of the plunger 66. The other end of the plunger 66 is provided with a knurled head by which the plunger may be rotated and pulled against the urging of the spring 68. The body of the plunger 66 is provided with a detent 69 in the form of a radially projecting rod which operates in an open slot 72 in the arm 65 to hold the plunger 66 disengaged from the plate 44. Pulling upon the knurled head against the spring 68 and rotation of the same 90 degrees permits the detent 69 to enter a deeper open slot 70 in the arm 65 thereby allowing full engagement between the plunger 66 and the plate 44. By rotating a work part held between the centers 24 and 26 through the divisions on the plate 44 and locking such work part with the plunger 66 in each such division 16 equally spaced flats can be precisely ground on the work part. Similarly, 8, 6, 4 and 2 such flats can be ground with the same index plate 44. Other index plates with any number of different divisions can be substituted for the plate 44 by removing the latter and using the same fasteners 45 to bolt the substitute index plate to the plate 42. The crank 48 must be removed and replaced in effecting such substitution. Another means 72 in the form of a set screw operating from the top of the headstock 18 is provided for locking the center 24 against rotation relative to the headstock 18. The center 24 is provided with an annular undercut 71 where the inner end of the set screw 72 bears against it so that its rotation will not be adversely affected by the action of the screw 72.

As shown in FIGS. 5 and 6 said fixture is constructed for use in combination with an attachment 75 for grinding reamers such as the reamer 73. The attachment 75 is disposed transversely of the base 10 and fastened to the top thereof by an inverted bolt 76 operating in one of the T-slots 16. A flat flexible finger 78 is threadably carried in an end of a bar 80 the other lower end of which is pivotally mounted via fastening means 82 on an end of the attachment 75. Rotation of the finger 78 relative to the bar 80 adjusts the extended position of the former relative to the attachment 75. The finger 78 is locked in any of its adjusted rotational positions by the nut 82. The lower end of the bar 80 is slotted, as at 86, for further adjustment of the extended position of the finger 78 relative to the attachment 75. The reamer 73 is inserted between the centers 24 and 26 as described for the workpart W and the attachment 75 including the position of the bar 80 is adjusted so that the finger 78 projects into the circle of the flutes on the reamer as shown in FIG. 6 to back up the reamer flute next adjacent to the one being ground. The working end of the reamer 73 is then brought into engagement with the tapered working face on the rapidly rotating grinding wheel 62 as shown in FIG. 5 so that the proper rake angle can be ground on the reamer flutes. The finger 78 prevents rotation of the reamer from reaction from contact with the wheel 62 during such grinding. As shown by the arrow 85 in FIG. 6 the grinding wheel 62 rotates anticlockwise as viewed therein and the finger 78 functions to prevent clockwise rotation of the reamer 73 during such grinding. After one flute on the reamer 73 is ground it is rotated clockwise as shown by the arrow 87 in FIG. 6 to the next adjacent flute. During such rotation of the reamer 73 the finger 78 is flexed and forced out of the circle of the reamer flutes by the flute which moves into the position vacated by such next adjacent reamer flute. The finger 78 automatically flexes back into its set position behind such newly positioned reamer flute next adjacent to the one being ground.

The fixture can be used for grinding its own centers as for sharpening them as shown in FIG. 7 for the center 24 of the headstock 18. In this instance the tapered end of the center 24 is held against a grinding wheel 67 by an angle block 90 (the angle of which is 30 degrees in the instance since the included angle of the taper on the centers 24 and 26 is 60 degrees) which is placed upon the table 12 perferably against a positioning plate 92. The angle block 90 is provided with a pair of longitudinally extending inverted T-slots 93 in which the heads of the fastening means 21 also operate to bolt the headstock 18 to the angle block 90. Rotation of the center 24 during grinding of the tapered end thereon is accomplished by the crank 48. The center 24 did not have to be removed from the headstock 18 for such grinding of its tapered end. The center 24 of the tailstock 20 need not be removed either. The upper end of the lever 29 need only be disconnected from the rear end of the center 24 and the crank 48 affixed thereto. The enlargement 25 on the rear end of the center 24 is provided with a rib 94 on which the slotted end of the crank 48 is received and with a threaded aperture 95 in which the fastener 47 may be engaged for affixing the crank 48 to the center 26 for manually rotating the latter to sharpen its end.

It will thus be seen that there has been provided by my invention a work handling fixture for surface grinding machines in which the object hereinabove set forth together with many thoroughly practical advantages has been successufully achieved. While a preferred embodiment of the invention has been shown and described it is to be understood that variations and changes may be resorted to without departing from the spirit of the invention as defined by the appended claims.

What is claimed is:

1. A work handling fixture for a surface grinding machine or the like comprising a base, a headstock and a tailstock carried on said base in axially spaced adjustable positions thereon, a pair of axially aligned centers one carried in each of said headstock and tailstock, the tailstock center axially slidable in said tailstock and means for yieldably maintaining the axial position of said tailstock center relative to the headstock center, the two centers having conical ends and capable of rotatably holding a workpart therebetween, the center in said headstock being rotatable, a manually rotatable crank, and direct drive means between said crank and the headstock center for driving said headstock center and the workpart in rotation at manual speeds the same as said crank, said means for yieldably maintaining the axial position of said tailstock center relative to the headstock center comprising yieldable means pulling upon said tailstock center to urge it toward the headstock center, and adjusting means for adjusting the pull of said yieldable means upon said tailstock center, a lever having one end operative upon said tailstock center, a pivot connection for the other end of the lever fast to said tailstock, and a tension spring operative upon said lever intermediate the ends thereof, a rod extending through said lever intermediate the ends thereof, one end of the rod connected to said tension spring, the other end of the rod operative upon said lever and carrying adjusting means for adjusting the tension of said tension spring.

2. A work handling fixture as claimed in claim 1, further comprising both fastening means and alignment means between said base and each of said headstock and tailstock, said fastening means including an axial inverted T-slot in said base and a fastener slidable in said T-slot carried in each of said headstock and tailstock, and said alignment means including an axial center slot in said base and a key slidable in said center slot carried in each of said headstock and tailstock.

3. A work handling fixture as claimed in claim 1, further comprising a pair of thrust bearing means fast on said headstock center one at each end of the headstock, an index plate carried on said headstock center, a first locking means operative upon said index plate for locking said headstock center against rotation, said first locking means including flats on one of said thrust bearing means, on said index plate and on said headstock center, and a second locking means operative directly upon said headstock center for locking the same against rotation.

4. A work handling fixture as claimed in claim 2 further comprising an auxiliary base for use with each of said headstock and tailstock for grinding said centers, said auxiliary base angled to the horizontal at an angle equal to half the included angle oft he conical end on each of said centers, said auxiliary base having an axial center slot in its angled face in which is receivable said key carried in each of said headstock and tailstock.

References Cited

UNITED STATES PATENTS

| | | |
|---|---|---|
| 1,694,074 | 12/1928 | Martone. |
| 2,136,491 | 11/1938 | Cornell. |
| 2,319,582 | 5/1943 | Carroll _____ 51—216 X |
| 2,429,250 | 10/1947 | Wiken. |
| 2,527,778 | 10/1950 | Trocki _____ 51—232 |
| 2,723,511 | 11/1955 | Castor _____ 51—225 |
| 2,746,218 | 5/1956 | Bowie _____ 51—216 X |

FOREIGN PATENTS 1,259,229  3/1961  France.

HAROLD D. WHITEHEAD, Primary Examiner

U.S. Cl. X.R.

51—232